United States Patent [19]

Brede et al.

[11] 3,744,127

[45] July 10, 1973

[54] METHOD OF MAKING MAGNETIC HEAD ASSEMBLY

[75] Inventors: Dwight W. Brede, Los Altos Hills; Miles H. Cook, San Jose; Marshall E. Freeman, San Jose; Harold L. Turk, San Jose, all of Calif.

[73] Assignee: International Business Machines Corporation, Armonk, N.Y.

[22] Filed: Mar. 8, 1971

[21] Appl. No.: 122,193

Related U.S. Application Data

[62] Division of Ser. No. 794,322, Jan. 27, 1969, Pat. No. 3,610,837.

[52] U.S. Cl......... 29/603, 179/100.2 P, 340/174.1 E

[51] Int. Cl............................. G11b 5/42, H01f 7/06

[58] Field of Search................ 29/603; 179/100.2 C, 179/100.2 P; 340/174.1 E, 174.1 F; 346/74 MC

[56] References Cited

UNITED STATES PATENTS

| | | | |
|---|---|---|---|
| 3,504,134 | 3/1970 | Miyata | 179/100.2 C |
| 3,562,444 | 2/1971 | Hoogendoorn et al. | 179/100.2 C |
| 3,432,921 | 3/1969 | Page | 29/603 |
| 3,064,333 | 11/1962 | Kristiansen et al. | 29/603 |

*Primary Examiner*—Charles W. Lanham
*Assistant Examiner*—Carl E. Hall
*Attorney*—Fraser & Bogucki and Robert W. Keller

[57] ABSTRACT

A method for making an air bearing slider assembly which includes a magnetic head and a body comprising a plurality of elements assembled together such that a recess and a slot are formed. The method includes forming the elements individually, finishing magnetic head supporting surfaces on one of the elements, bonding the plurality of elements together to form the body having a recess and a slot therein, positioning the magnetic head with its associated legs supported on the supporting surfaces and with its gap positioned in the slot, filling the slot with a glass that surrounds and wets the magnetic head, and cooling the glass.

5 Claims, 4 Drawing Figures

*INVENTORS*
DWIGHT W. BREDE
MILES H. COOK
MARSHALL E. FREEMAN
HAROLD L. TURK

*Fraser and Bogucki*
ATTORNEYS

INVENTORS
DWIGHT W. BREDE
MILES H. COOK
MARSHALL E. FREEMA
HAROLD L. TURK
Fraser and Bogucki
ATTORNEYS

METHOD OF MAKING MAGNETIC HEAD ASSEMBLY

This application is a division of U.S. Pat. No. 3,610,837, based on copending application Ser. No. 794,322, filed Jan. 27, 1969.

BACKGROUND OF THE INVENTION

1. Field of the Invention

The present invention relates to a method of making magnetic head assemblies, and more particularly to air bearing slider assemblies used for noncontact recording in magnetic disk files and the like.

2. Description of the Prior Art

With ever increasing demands being placed on various magnetic recording systems due to increased density, signal frequency and the like, it has become necessary that equipment be used which adheres to relatively close tolerances and which minimizes the types of error producing variations commonly present in older and less sophisticated systems. In magnetic disk files, for example, factors such as data density may dictate the use of noncontact transducing in which the transducing elements are required to be kept very close to the recording surface of the record medium or disk. For such applications, variations in the flying height of the transducing elements relative to the recording surface of the disk must be minimized in order to reduce variations in signal amplitude and resolution to a tolerable level.

One technique which provides for noncontact transducing within relatively close tolerances involves the mounting of a magnetic head in an air bearing slider that floats, by hydrodynamic action, over the rotating disk. The slider assembly is carried by an appropriate mounting arrangement such as that shown in U.S. Pat. No. 3,579,213, and assigned to the same assignee at the present application. An example of the air bearing slider assembly itself is provided by U.S. Pat. No. 3,577,191, and commonly assigned with the present application.

In the slider assembly of U.S. Pat. No. 3,577,191, a U-shaped magnetic head is positioned against the walls of a T-shaped slot in a slider body using either an adhesive or the resiliency provided by elements used to mount a bridging core element or backbar between the legs of the head. This slider assembly works reasonably well for most, if not all, noncontact transducing applications. As use of assemblies of this type becomes more widespread, however, and as the performance demands placed thereon increase, it may be desirable to provide various manufacturing and structural advantages not presently available. Thus, as greater packing density of the data on the magnetic recording medium requires thinner magnetic heads, for example, it becomes increasingly important that the relatively brittle legs of the head be positioned against supporting surfaces in the body of the slider assembly which are very smooth and flat. Supporting surfaces having the requisite flatness and smoothness are very difficult to achieve where the slider body is fabricated as an integral piece or unit, primarily because of the difficulty in lapping and polishing the supporting surfaces which reside within a relatively small recess in the formed slider body. Increased data packing density has further reduced the allowable movement which the magnetic head may undergo relative to the slider body during use of the assembly. Where the magnetic head is mounted within the slider body using an adhesive such as epoxy, the head commonly undergoes creep relative to the body, seriously impairing the accuracy of the assembly and eventually resulting in damage or destruction to the head if the creep is sufficient to permit the head to contact the magnetic recording medium.

BRIEF SUMMARY OF THE INVENTION

Air bearing slider assemblies in accordance with the invention include a body, which is assembled from a plurality of ceramic elements using a very strong adhesive such as glass, and at least one magnetic head mounted within a slot in the formed slider body using glass. The fabrication of the slider body from a plurality of different ceramic elements facilitaes the grinding and polishing of the supporting surfaces for the magnetic head by providing easy access thereto prior to the assembly of the body. The use of glass to mount the magnetic core within the formed slider body limits creep of the head to a tolerable level. Head creep, moreover, may be further limited by choosing a ceramic body material having a temperature coefficient of expansion compatible with that of the magnetic head material and the glass used to mount the head. The glass surrounds the head in a manner so as to substantially equalize any forces on the head which may result from slight temperature incompatibility.

In one preferred embodiment of an air bearing slider assembly in accordance with the invention, the slider body is comprised of separate flange, face and bride elements molded of a ceramic material which is thermally compatible with the magnetic head and with the glass used to mount the head in the slider body. The flange element includes a pair of surfaces, which support the opposite, relatively fragile legs of a generally U-shaped ferrite recording head in the completed assembly, and which are finished to the desired flatness and smoothness such as by grinding and polishing prior to assembly of the three elements to form the slider body. The flange and bridge elements are then placed on top of the face element with a layer of glass frit between the mating surfaces thereof, and the resulting arrangement is heated to a temperature sufficient to make the glass fluid and pressurized, if desired, to enhance wetting of the surfaces of the adjacent ceramic elements by the glass and to impart a desired thickness to the glass bond formed thereby.

The magnetic head is positioned within the formed slider body so that a substantial portion of each leg resides against one of the prefinished supporting surfaces of the flange element and the remaining portion of each leg and the interconnecting base are disposed within a slot in the face element of the slider body. The slot is then filled with a bead of fluid glass which surrounds and wets the head as well as the walls of the slot to chemically and physically bond the head to the slider body when cooled. The lower surface of the face element and included base of the magnetic head are then finished such as by grinding, lapping and polishing to provide a suitable air bearing surface which is flat or of desired curvature and to render the lower edge of the head base and included nonmagnetic gap generally continuous with the air bearing surface. The bridge and flange elements have recessed portions which respectively define the crossbar and leg portions of a generally T-shaped recess which extends downwardly from the upper surface through a portion of the thickness of the formed slider body. The crossbar portion of the recess, which includes the supporting walls for the head, accommodates a core element or backbar and included coil to bridge the upper portions of the legs of the head and complete a magnetic path to the gap. The leg portion of the recess accommodates a loading mechanism so that a proper air bearing can be maintained during use of the slider assembly.

BRIEF DESCRIPTION OF THE DRAWINGS

A better understanding of the invention may be had by reference to the following description taken in conjunction with the accompanying drawings, in which.

DETAILED DESCRIPTION

Figure 1:
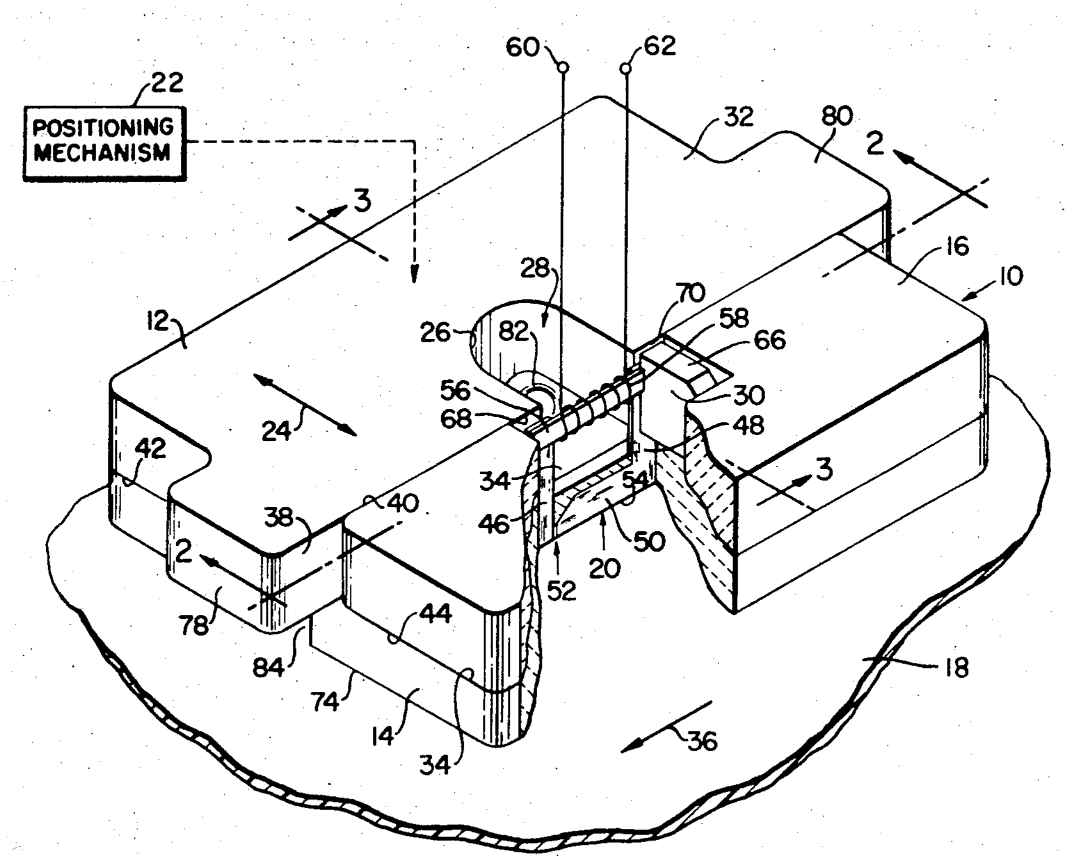
FIG. 1 is a perspective, partially broken-away view of a magnetic head assembly in accordance with the invention.

A magnetic head assembly in accordance with the invention, referring to FIG. 1, includes a carrier or vehicle body 10 which is preferably of ceramic material and which is formed by a flange element 12, a face element 14 and a bridge element 16. The vehicle body 10 in the present example comprises an air bearing slider or shoe for disposition adjacent a magnetic recording surface 18. The slider body 10 supports one or more magnetic heads in precise spacial disposition relative to the magnetic recording surface 18, which is typically a high speed disk memory for a digital data processing system. Although only a single magnetic head 20 is shown for simplicity, it will be appreciated that multiple parallel heads or separate erase, record and reproduce heads, or various combinations thereof, can be employed. In one specific disk memory system in which the arrangement of FIG. 1 is utilized, however, each slider body 10 supports only a single magnetic head 20. A positioning mechanism 22 for moving the slider body 10 relative to the magnetic recording surface 18 as shown by an arrow 24 may comprise any well known arrangement, such as a slider carriage radially disposed relative to the disk, a movable arm rotatable about a pivot point, or any of numerous other available expedients now used in the art, if a movable head system is desired to be employed. The slider body 10, however, may also be used in a fixed head system.

In the practical example illustrated, the slider body 10 is substantially rectangular in shape and is relatively small with overall dimensions of less than one-half inch on each side. The flange element 12 includes a recessed portion which defines the leg portion 26 of a generally T-shaped recess 28 in the body 10. The crossbar portion 30 of the recess 28 is defined by a recessed portion within the bridge element 16. The T-shaped recess 28 extends downwardly from the upper surface 32 of the body 10 through the entire thickness of the flange and bridge elements 12, 16 to the upper surface 34 of the face element 14. The upper arm or crossbar portion 30 of the T-shaped recess 28 lies substantially parallel to the direction of relative movement between the slider body 10 and the magnetic recording surface 18 as shown by an arrow 36 in FIG. 1.

The flange and bridge elements 12, 16 have edges 38 and 40 which are joined together to form a combined upper element substantially coextensive with the face element 14. The respective lower surfaces 42 and 44 of the flange and bridge elements 12, 16 are bonded to the upper surface 34 of the face element 14 to complete the slider body 10. The various body elements 12, 14 and 16 are bonded together using an adhesive such as glass as described in detail hereafter.

Figure 3:
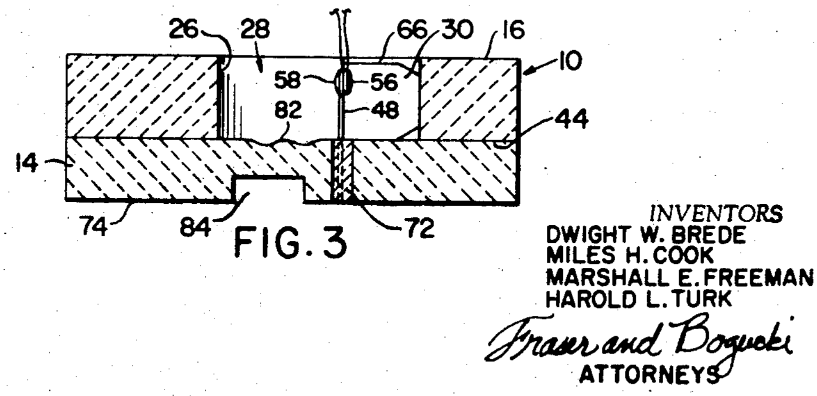
FIG. 3 is a side sectional view of the arrangement of FIG. 1 taken along the lines 3—3 thereof.

The body of the magnetic head 20 is generally U-shaped, having a pair of upstanding legs 46 and 48 and a base 50 joining the lower portions of the legs. The base 50 includes a nonmagnetic gap 52 which extends upwardly into the base from the lower edge 54 thereof and which comprises a glass spacer disposed between butting surfaces of the leg 46 and the base 50. A core element or backbar 56 bridges the upper portions of the legs 46 and 48 to complete a magnetic path to the gap 52. The core 56 is encompassed by a coil 58, and terminals 60 and 62 from the coil 58 are coupled to associated circuitry (not shown). The core 56 is held in place against the legs 46 and 48 of the head by any appropriate means such as elastomeric clamps 64 and 66 of the type shown in the previously referred to U.S. Pat. No. 3,577,191. Only the right-hand clamp 66 is shown in FIG. 1 for reasons of clarity. The upper portions of the opposite legs 46 and 48 of the head reside against and are supported by a pair of opposite and coplanar walls 68 and 70 within the crossbar portion 30 of the T-shaped recess 28 as provided by the flange element 12. The lower portions of the legs 46 and 48 and the base 50 of the head are disposed within a glass filled slot 72 (as best shown in FIG. 3) in the face element 14.

Figure 2:
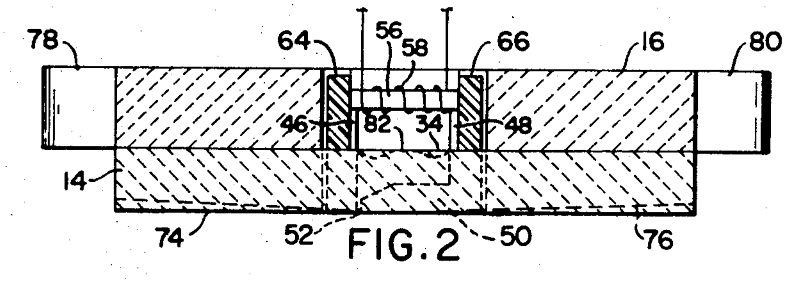
FIG. 2 is a front sectional view of the arrangement of FIG. 1 taken along the lines 2—2 thereof.

The base surface 74 of the slider body 10 as provided by the lower surface of the face element 14 may be either flat, or curved in concave fashion as shown by the dashed line 76 in FIG. 2, as desired, to provide an air bearing surface for the slider assembly. The slider body 10 is mounted on the positioning mechanism 22 by a pair of ears 78 and 80 which are provided by the flange element 12 and which extend transversely from the slider body 10. The ears 78 and 80 may be plated with a metal and soldered to the positioning mechanism 22 if desired. A recess 82 of circular configuration at the bottom surface of the leg portion 26 of the T-shaped recess 28 receives a load device from the positioning mechanism 22 to facilitate dynamic control of the air bearing function of the slider assembly.

To effect the magnetic recording and readout of data relatively closely packed on the recording medium 18, the head 20 must have a relatively small thickness, typically on the order of 0.0047 inch with a tolerance of ±0.00020 inch. Heads having thicknesses within this range are very brittle and the legs are easily broken, particularly during mounting of the head within the slider body and during installation of the core element within the T-shaped recess. Damage to the head is generally avoided if the opposite supporting surfaces or walls 68 and 70 are finished such as by grinding and polishing to make them very flat and smooth. Such finishing is very difficult if not impossible to accomplish where the slider body 10 is fabricated as an integral unit, primarily because of the very limited access to the supporting walls 68 and 70 afforded by the T-shaped recess 28. In accordance with the invention, however, the slider body 10 is assembled from the previously formed elements 12, 14 and 16, and the walls 68 and 70 may accordingly be finished to the desired smoothness and flatness prior to assembly of the elements into the completed body.

Factors such as data density may further dictate that the magnetic head be held relative to the slider body in very rigid fashion and that any creep undergone by the head relative to the body not exceed a value on the order of 5 microinches. In slider assemblies in which the head is mounted to the body using an adhesive such as epoxy, creep of the head may become substantial under certain conditions of temperature and humidity, and through prolonged use may become so extensive that the lower edge 54 of the base 50 of the head strikes the surface of the recording medium 18. Such contact usually results in chipping of the head. Moreover, even where temperature and humidity are closely controlled, magnetic heads bonded by epoxy can commonly undergo creep by as much as 150 microinches, greatly impairing the transducing accuracy of the slider assembly.

In accordance with the invention, however, the magnetic head 20 is held within the slot 72 using glass as the adhesive. The resulting creep of the head relative to the slider body is well within the ranges of tolerance requird by close packing densities, and is not generally subject to variations in temperature and humidity. Moreover, the glass surrounds the magnetic head in such a manner that any forces on the head which may result such as from unequal temperature expansion and contraction of the materials are substantially equalized. Such forces may be minimized by choosing a glass and ceramic having temperature coefficients of expansion close to that of the magnetic head.

Figure 4:
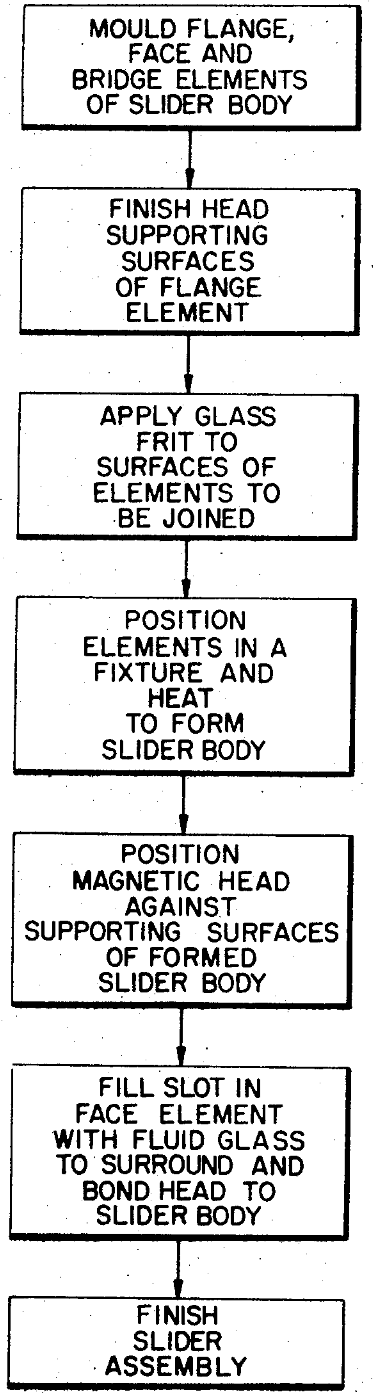
FIG. 4 is a block diagram of successive steps employed in one method of fabricating magnetic head assemblies in accordance with the invention.

The successive steps of one preferred method of fabricating air bearing slider assemblies in accordance with the invention are shown in block diagram form in FIG. 4. Fabrication of the assembly body is begun by molding the flange, face and bridge elements 12, 14 and 16 from an appropriate ceramic material. The surfaces of the flange element 12 which will later form the supporting walls 68 and 70 for the head legs in the completed assembly are then finished to a desired flatness and smoothness using appropriate techniques such as grinding, lapping and polishing. This having been done, the three elements 12, 14 and 16 are bonded together to form the completed slider body 10. Although the elements can be bonded together using any appropriate adhesive, glass is generally preferred among other reasons because of its strength.

A frit of glass chunks is applied to the mating surfaces of the elements 12, 14 and 16 prior to the assembly of the elements within an appropriate fixture. The glass frit is preferably deposited on the bonding surfaces of the elements using a transfer tape made of "Mylar" or other appropriate material. An adhesive is added to the glass frit, and the frit is then sprayed on the tape. Upon contact between the tape and the bonding surfaces of the elements, the glass adheres to the surfaces in a relatively uniform, thin layer. Alternatively, the glass frit may be applied to the element surfaces using a silk screen spray or sputtering, although sputtering of the glass generally provides a thinner layer than desired. The mating surfaces of the elements 12, 14 and 16 may be preglazed prior to the assembly thereof, if desired, by heating glass frit which has been deposited on the surface by an appropriate method such as those described above to the melting point of the glass, then allowing the glass to cool.

The ceramic elements 12, 14 and 16 are then joined together to form the slider assembly body by positioning the elements together in an appropriate fixture and heating the glass to its working temperature or melting point whereby it becomes fluid. Depending on the viscosity of the fluid glass, it may be desirable to press the elements together in order to enhance the wetting of the ceramic by the glass and to reduce the thickness of the glass bonds to a desired value on the order of 2 mils or less. The glass joints or bonds are allowed to cool forming the assembled slider body 10.

The glass joints formed between the ceramic elements are generally as strong as the elements and accordingly provide a body which is strong and rigid. The use of a three-piece construction optimizes the molding of the individual ceramic elements because of the generally uniform cross-sections of the elements. Uniform cross-sections are advantageous for a number of reasons including the fact that the glass used to join the elements is not forced laterally to result in imperfections during the bonding of the elements to one another. Ceramic slider bodies 10 in accordance with the invention can be assemblied from other numbers of elements such as two or four, but suffer the disadvantage that the cross-sections of the various elements in such constructions are not generally uniform.

Upon completion of the slider body 10, the magnetic head 20 is mounted within the body by positioning the head at a desired location within the body using a fixture different from that used to assemble the body elements and preferably having an appropriate clamping arrangement for temporarily holding the head in place. Such clamping arrangement may rely upon the surfaces 68 and 70 for support of the opposite legs of the head. The slot 72 within the face member 14 is then filled with a fluid glass composition so as to surround and wet the lower portion of the magnetic head 20 as well as the walls of the slot. The glass preferably has a relatively low working temperature on the order of 650° C. or less to insure that the glass joints between the ceramic elements 12, 14 and 16 and the glass spacer forming the nonmagnetic gap 52 are not disturbed. The configuration of the slot 72 controls the capillary flow of the glass resulting in forces on the opposite sides of the head which are generally balanced. Any appropriate technique can be used to form a fluid head which will fill the slot 72 and surround the magnetic head 20 in the desired manner. For most applications this can be accomplished by placing lengths of glass rodding of appropriate size on the opposite sides of the magnetic head at the entrance to the slot 72, then heating the glass to a fluid state so that it flows into the slot and surrounds the head. To insure that the glass fills in around the edges of the head however, it is generally preferable that the bonding glass be preformed into a configuration which will introduce a considerable volume of glass into the slot at the edges of the head when heated to a fluid state. This may be accomplished by heating the opposite ends of a pair of spaced apart lengths of glass rod causing the glass to form an interconnecting mass at the opposite ends. The resulting arrangement is then placed over the magnetic head and disposed at the entrance to the slot. Upon heating to a fluid state the end masses of the glass arrangement flow into the slot adjacent the ends of the head to insure that the voids between the head edges and the slot walls are completely filled in.

Upon formation of the glass bond within the slot 72, the lower or air bearing surface 74 of the slider assembly and included lower edge 54 of the base 50 of the head are then ground, lapped and polished as appropriate to finish the assembly and to provide a smooth air bearing surface which is either flat or curved as desired. A groove 84 (shown in FIG. 1) extending upwardly into the face element 14 from the bottom surface 74 thereof in a direction generally parallel to the base 50 of the magnetic head 20 may be machined into the completed slider assembly at this time or upon fabrication of the face element 14 as desired. The groove 84 is employed where it is desired to adjust the load on the air bearing surface by reducing the surface area.

The magnetic head 20 is preferably of ferrite material, particularly where high frequency transducing is to be used. Where lower frequencies are involved, heads of non-ferrite material such as Permalloy can also be used. Thin film heads such as those sputtered onto a substrate or formed by vacuum deposition or similar techniques can moreover be used in accordance with the invention. Ferrite magnetic heads often have a gap depth or throat height on the order of 35 mils. During the glass bonding of the head to the completed ceramic body, the head is normally held in position within the face element slot 72 such that about 32 or 33 mils of the gap depth protrude from the slot 72 and beyond the lower surface 74 of the face element 14. During the finishing process, the protruding portion of the head is ground off so that the lower edge 54 of the base 50 of the head becomes flush with or continuous with the lower surface 74. The surface 74 is then lapped and polished to provide the desired smoothness and to provide a gap depth or throat height on the order of 1 mil or less.

Although the glass within the slot 72 in the slider body surrounds the lower portion of the magnetic head 20 in a manner so as to substantially equally distribute the forces on the head, it is desirable for most applications of the slider assembly that the head, glass and ceramic body have generally compatible thermal characteristics to reduce such forces to the extent possible. Most glasses used to bond the magnetic head to the slider body have a temperature coefficient of expansion which is less than but relatively close to that of most ferrite materials used for the head 20. One preferred ceramic material which has a temperature coefficient above but close to that of most ferrite materials and which may be used as the elements 12, 14 and 16 of the slider body is a compound comprising approximately 20 percent Baria and approximately 80 percent Titania.

While the invention has been particularly shown and described with reference to a preferred embodiment thereof, it will be understood by those skilled in the art that various changes in form and details may be made therein without departing from the spirit and scope of the invention.

We claim:

1. A method of making an air bearing slider assembly having a body comprising a plurality of elements assembled and bonded together such that a recess in the body is formed, a slot communicating with said recess, and two finished spaced apart coplanar magnetic head supporting surfaces on one of said elements and a magnetic head comprising two legs of magnetic material joined at one end by magnetic pole pieces separated by a magnetic gap, said method comprising the steps of:

forming a plurality of elements, individually;

finishing the said magnetic head supporting surfaces;

bonding said plurality of elements together to form the body of the air bearing slider assembly having said recess and said slot therein;

positioning the magnetic head such that each of said legs lays against and is supported by one of said supporting surfaces and said gap is positioned in said slot;

filling the slot with a first fluid glass composition so as to surround and wet the magnetic head; and cooling said first fluid glass composition to bond the magnetic head to the formed body.

2. The method set forth in claim 1, wherein a second glass bonds said plurality of elements together to form the body of the air bearing slider assembly.

3. The method set forth in claim 2, wherein the step of glass bonding the plurality of elements together includes the steps of:

applying said second glass in a pattern selectively to at least one of the elements;

positioning said elements in an appropriate fixture so that said second glass pattern is disposed between adjacent element mating surfaces;

heating said second glass pattern to fluidity; and allowing said fluid second glass to cool, thus bonding the slider elements into an integral unit.

4. The method set forth in claim 2, wherein said second glass that bonds the slider elements together has a higher working temperature than said first glass that bonds the magnetic head to the slider, whereby the bond between the slider elements is not disturbed when the magnetic head is bonded to the formed slider body.

5. The method set forth in claim 4 wherein said magnetic head is positioned within the slot with a portion protruding beyond the lower surface of said formed slider body and further comprising the step of:

grinding said protruding portion of said magnetic head and said lower slider body surface into an air bearing surface such that the magnetic head is continuous.

* * * * *